June 30, 1970 T. W. PEARCE ET AL 3,518,455

PULSE GENERATOR

Filed Dec. 11, 1967 2 Sheets-Sheet 1

THOMAS W. PEARCE
ARTHUR K. HOCHBERG
THEODORE O. POEHLER, Jr.
INVENTORS

BY J. O. Tresansky
ATTORNEY

THOMAS W. PEARCE
ARTHUR K. HOCHBERG
THEODORE O. POEHLER, Jr.
INVENTORS

United States Patent Office 3,518,455

Patented June 30, 1970

3,518,455

PULSE GENERATOR

Thomas W. Pearce, Mount Rainier, Arthur K. Hochberg, Ellicott City, and Theodore O. Poehler, Jr., Baltimore, Md., assignors, by mesne assignments, to the United States of America as represented by the Secretary of the Navy Filed Dec. 11, 1967, Ser. No. 689,358

Int. Cl. H03k *1/18*

U.S. Cl. 307—265 8 Claims

ABSTRACT OF THE DISCLOSURE

A pulse generator for the provision of high-energy short-duration pulses. A capacitor is charged by a DC power source and is made to discharge through a load when a first external pulse triggers a first SCR circuit. When it is desired that the high-energy pulse be turned off, a second and delayed external pulse is caused to trigger a second SCR circuit. When said second SCR circuit is triggered, the energy stored in the capacitor is directed toward a dissipative network and is thereby diverted from the load. The duration of the high-energy pulse can be closely controlled since said duration depends basically upon the delay between the initiation of the first and second external triggering pulses.

BACKGROUND OF THE INVENTION

Field of the invention

The subject invention relates to a high-energy pulse generator comprising charging means, energy storing means, discharging means and pulse terminating means. More particularly, a capacitor is charged by a DC power source and retains its charge until acted upon by an SCR circuit whereupon the capacitor is caused to discharge through a load. When it is desired that the pulse be terminated, a second SCR circuit is activated causing the circuit energy to be diverted from the load and dissipated.

Description of the prior art

The electronic circuits which are capable of producing high-energy pulses having rapid rise and fall times are limited to three broad classes. The first class of circuits includes the mechanical switching circuits wherein mechanical switches open and close the current path to the load; the second includes the thyratron switching circuits, such as that shown in U.S. Pat. No. 3,100,872 issued to Hickey et al. in August 1963, wherein an external pulse fires a thyratron and thereby defines the leading edge of an output signal and wherein an LC circuit having a predetermined time delay causes a second thyratron to fire and thereby defines the trailing edge of the output signal; and the third includes the solid state switching circuits, such as that shown in U.S. Pat. No. 3,249,770 issued to Hickey in May 1966, wherein an SCR network is used in combination with a delay line energy source and wherein the pulse output is dependent upon the minority carrier characteristics of diodes.

While each of the three classes of circuits known to the prior art and noted above has its advantages, these advantages are accompanied by certain disadvantages. More particularly, mechanical switching circuits tend to be rather slow; the mechanical switching circuits and the thyratron switching circuits tend to be noisy; and the solid state switching circuits tend to be extremely complex.

SUMMARY OF THE INVENTION

In the study of solid state plasmas and impact ionization in semiconductors, minimum electric field strengths of several hundred volts per centimeter are required. For high mobility high-carrier concentration materials, such as InSb or InAs, the specific requirement is for a variable source of 0–500 volts which can supply currents to a load of 1 to 100 ohms. To prevent heating of the specimen, such fields must be applied in the form of short, low repetition rate pulses. The pulse unit of the instant invention supplies pulses up to 500 volts and 1000 amperes with a pulse duration as low as $0.5\mu$ sec. Additionally, the pulse generator circuit of the instant invention is far less bulky than the mechanical or the thyratron switching circuits and is far less complex than the solid state switching circuits presently known to the prior art. And still further, the subject pulse generator is fast, relatively noise free and provides pulses which have rapid rise and fall times and which also have voltage levels which are relatively insensitive to changes in the load impedance.

It is therefore an object of the invention to provide a pulse generator circuit capable of producing high-voltage high-current pulses.

It is another object of the invention to provide a pulse generator circuit which is relatively compact and inexpensive to manufacture.

It is a further object of the invention to provide a pulse generator circuit capable of producing very short duration pulses.

It is an additional object of the invention to provide a pulse generator circuit which is relatively noise free.

It is still another object of the invention to provide a pulse generator circuit capable of producing pulses having very rapid rise and fall times.

It is yet a further object of the invention to provide a pulse generator circuit capable of producing pulses whose voltage levels are relatively insensitive to changes in load impedance.

These and other objects of the invention, as well as many attendant advantages thereof, will become more readily apparent when reference is made to the following description taken in conjunction with the accompanying drawings.

DESCRIPTION OF THE PREFERRED EMBODIMENTS

Generally, the subject pulse generator comprises voltage storing means, means to charge said voltage storing means, and means to control the discharge of the voltage storing means through a load. The discharge controlling means is associated with the voltage storing means and with the load in such a manner that the rise time and the fall time of pulses emitted by the pulse generator can be precisely controlled. Therefore, the present invention is a pulse generator circuit which is capable of producing very short pulses which have rapid rise times and rapid fall times.

Figure 1:
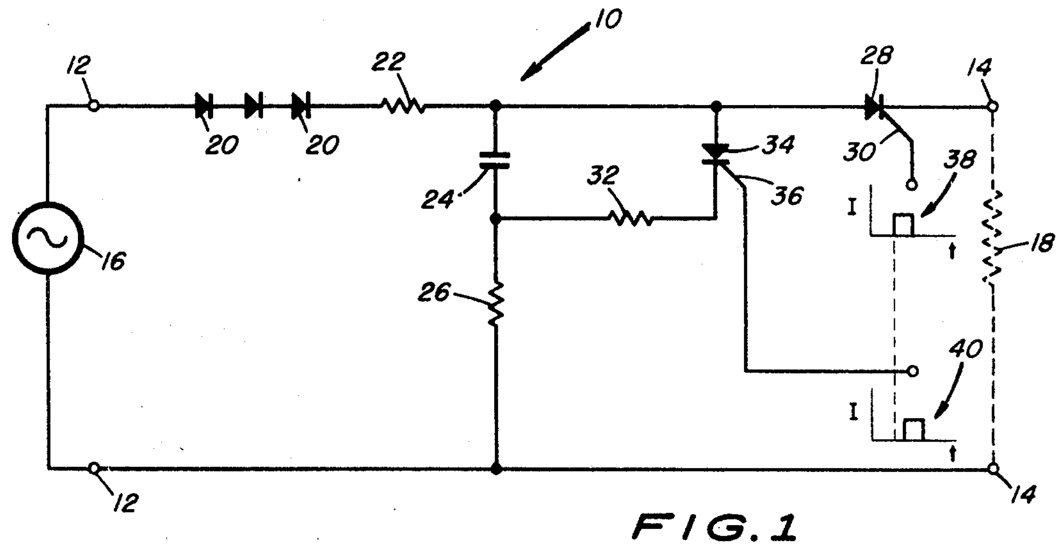
FIG. 1 is a simplified circuit schematic of the instant invention.

Referring first to FIG. 1, there is shown a simplified circuit schematic of a first embodiment of the subject pulse generator. Before undertaking a detailed explanation of the operation of the pulse generator shown in FIG. 1, there follows a description of the individual elements comprising the circuit. The pulse generator is shown generally at 10 and has a pair of input terminals 12 and a pair of output terminals 14. Connected across the input terminals 12 is a signal source 16; and connected across the output terminals 14 is a load 18. Associated with one of the input terminals 12 are an array of diodes 20 and a resistor 22. Associated with the diodes 20 and the resistor 22 is a capacitor 24, one terminal of which is connected directly to resistor 22 and the other terminal of which is connected to ground through a resistor 26. Providing a connection between the capacitor 24 and the output terminal 14 is a silicon controlled rectifier (SCR) 28 having a gate electrode 30. Further associated with capacitor 24, and forming a dissipative circuit thereacross, is a resistor 32 and a second SCR 34 having a gate electrode 36. Connected to the gate electrode 30 of the SCR 28 is a first pulse source shown diagrammatically at 38; and connected to the gate electrode 36 of the SCR 34 is a second pulse source shown diagrammatically at 40. It should be noted that the pulse associated with the gate electrode 36 is delayed in time from that pulse associated with the gate electrode 30.

In operation, an AC signal from the signal source 16 is converted to a DC signal by diodes 20 which make up a half-wave rectifier; and said DC signal causes a DC voltage to be impressed across resistor 22. The DC voltage created by the coaction of the diodes 20 and the resistor 22 is used to charge the capacitor 24. It should be noted that the discharge path between the capacitor 24 and the load 18 is interrupted by SCR 28; and therefore, capacitor 24 does not discharge through the load 18 until SCR 28 is in its conductive state. SCR 28 is made to go conductive only when triggered by the pulse source 38. Reiterating, an AC signal from source 16 is converted to a DC voltage and is stored across capacitor 24 whereupon capacitor 24 is made to discharge through load 18 only when SCR 28 is triggered by pulse source 38. Therefore, it can be said that pulse source 38 defines the leading edge of a pulse reaching load 18 since load 18 "sees" no signal until SCR 28 is triggered by pulse source 38.

In a pulse generator, it is required not only that circuitry be provided for causing a signal to flow through a load, but also that circuitry be provided for interrupting the signal path to the load. The circuitry in FIG. 1 which so interrupts the signal path to the load comprises the resistor 26, the resistor 32, the SCR 34 and the pulse source 40. More particularly, when pulse source 40 triggers SCR 34 and causes SCR 34 to go conductive, a low-resistance current loop is provided from capacitor 24, through a small resistor 32, through the SCR 34, and back to the capacitor 24. Therefore, when SCR 34 becomes conductive, the charge stored in the capacitor 24 is dissipated in the resistor 32. Assisting in the dissipation of the charge stored in capacitor 24 is the resistor 26. It is therefor apparent that when SCR 34 is triggered by pulse source 40, the charge stored in capacitor 24 is diverted from the load 18 and is dissipated in resistors 26 and 32. It can therefore be said that pulse source 40 defines the trailing edge of the pulse reaching load 18 since load 18 "sees" a signal only until the time when SCR 34 is triggered by pulse source 40. It should here be noted that the duration of the pulse reaching load 18 depends basically upon the time delay between the initiation of pulse source 38 and the initiation of pulse source 40. Since this time delay can be precisely controlled by external circuitry, it becomes obvious that the subject pulse generator is capable of generating extremely short duration pulses.

While the pulse generator 10 of FIG. 1 proves adequate for the production of short duration pulses of the low-current variety, when it is desired that short duration pulses of the high-current variety be produced, circuitry in addition to that shown in FIG. 1 is required. This requirement is brought about by the current and reaction time limitations associated with SCR 34 which is in the dissipative loop.

Figure 2:
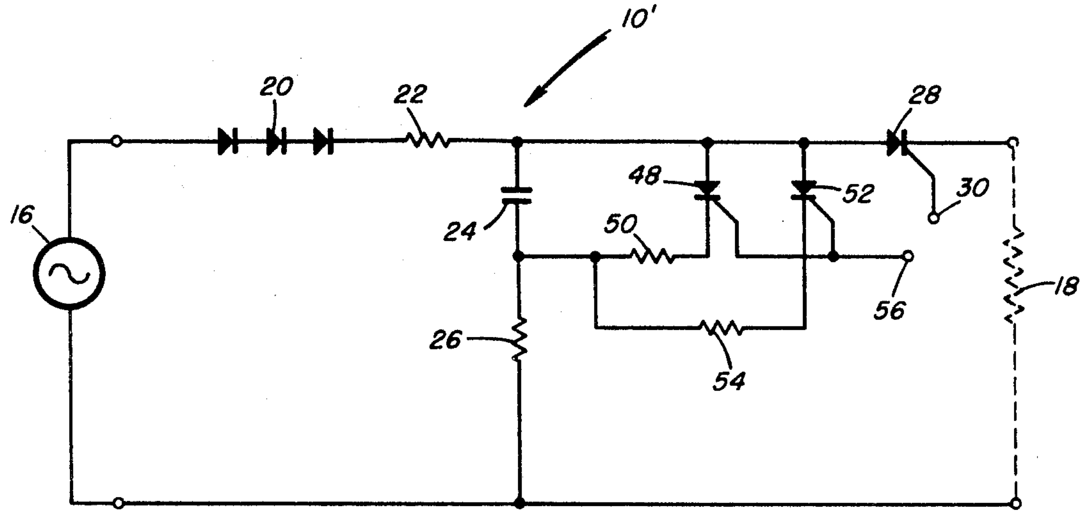
FIG. 2 is a circuit schematic of a second embodiment of the instant invention capable of high-current operation.

Referring now to FIG. 2, there is shown a second embodiment of the subject pulse generator which is capable of producing short duration pulses of the high-current variety. Since the pulse generator shown in FIG. 2 is similar in most respects to that shown in FIG. 1, like elements are similarly referenced and there follows only a discussion of the differences therebetween. As noted above, the pulse generator shown in FIG. 1 has current and reaction time limitations since SCR 34, in the dissipative loop, has a current level associated therewith which, if exceeded, would destroy the device, and since the reaction time associated with SCR 34 is directly proportional to the current passing therethrough. Therefore in FIG. 2, the single SCR dissipative loop of the first embodiment is replaced by a plurality of parallelly connected SCR-resistor dissipative loops. More particularly, the dissipative circuitry of the pulse generator shown generally at 10′ comprises an SCR 48 and a resistor 50 forming a first dissipative loop and an SCR 52 and a resistor 54 forming a second dissipative loop. The gates from the SCR 48 and the SCR 52 are connected together and form a single terminal 56 analogous to the terminal 36 shown in FIG. 1. It therefore becomes obvious that when SCR 48 and SCR 52 are triggered by an external pulse source (not shown), the charge stored in capacitor 24 is dissipated, in equal amounts (if resistor 50 is equal in value to resistor 54), between the dissipative loops containing SCR 48 and SCR 52, respectively. Therefore, the pulse generator shown in FIG. 2 is capable of handling twice the amount of current as that pulse generator shown in FIG. 1 since each of the diodes 48 and 52 share, in equal amounts the circuit current. It should be noted, though, that the pulse generator of the instant invention is not limited to two SCR dissipative loops, but can be made to contain any number of dissipative loops depending upon the amount of current expected to be flowing in the circuit. It should further be noted that the addition of each SCR not only increases the current capability of the circuit, but also enhances the response times of the SCR switches.

Figure 3:
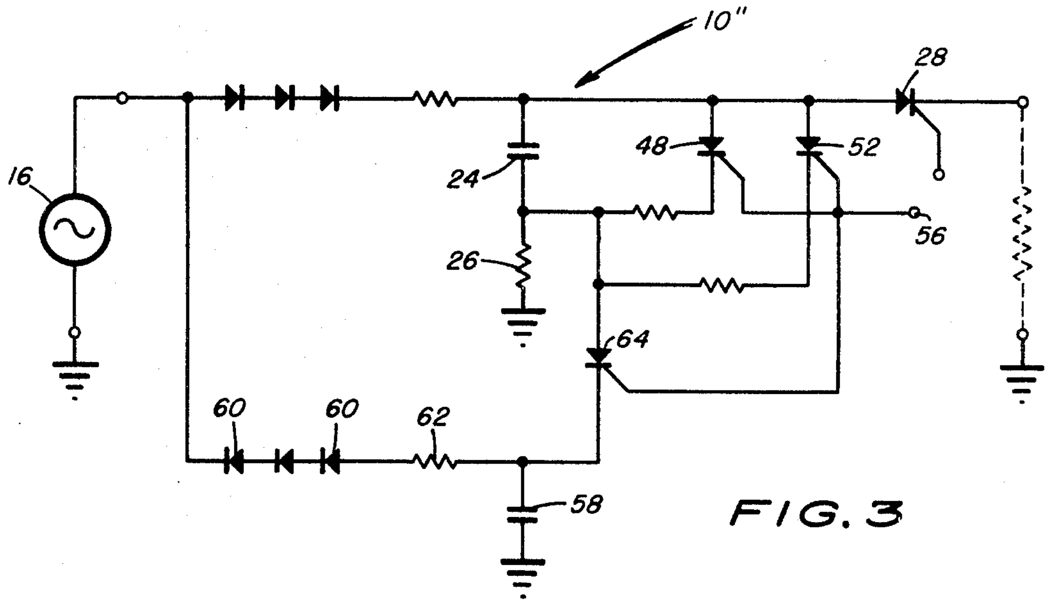
FIG. 3 is a schematic drawing of a third embodiment of the instant invention capable of precisely defining the fall time associated with the output pulses.

While the pulse generators shown in FIGS. 1 and 2 produce pulses having rapid rise times and rapid fall times, it has been found that the fall time can further be quickened by the addition of some simple circuitry. With reference then to FIG. 3, there is shown a third embodiment of the subject pulse generator shown generally at 10″. Again, due to the similarities between the pulse generator of FIG. 3 and those shown in FIGS. 1 and 2, like elements are similarly referenced and there follows a discussion only of the differences therebetween. It has been noted that the fall time associated with the pulse generators shown in FIGS. 1 and 2 can be shortened by the addition of circuitry. This is brought about by the fact that the fall time is dependent upon the time required to completely discharge capacitor 24; and this time, inturn, is dependent upon the value of the resistors in the dissipative loops. It has been found however, that capacitor 24 can be made to discharge more rapidly by connecting said capacitor to a voltage source opposite in polarity to that voltage stored across said capacitor. Therefore, a capacitor 58 is charged by signal source 16 through an array of diodes 60 and a resistor 62—the voltage across capacitor 58 being of opposite polarity than the voltage across capacitor 24. The capacitor 58 is then connected to the capacitor 24 through an SCR 64, the gate of which is connected to the terminal 56 which is also common to the gates of SCR 48 and SCR 52. In operation, the AC signal generated by the signal source 16 is converted to a DC signal by the diodes 60 and a DC voltage is caused to appear across resistor 62. The voltage across resistor 62 causes capacitor 58 to be charged. Upon the application of a pulse at terminal 56, SCR 64, as well as SCR 48 and SCR 52, becomes conductive thereby creating a current path between capacitor 24 and capacitor 58. Since the voltage across capacitor 58 is opposite in polarity to the voltage across capacitor 24, the charge across capacitor 24 is caused to drain into capacitor 58. Therefore, in FIG. 3, the means employed in dissipating the charge stored in capacitor 24 comprise not only the dissipative loops containing SCR 48 and SCR 52 and the resistor 26, but also capacitor 58. It should here be noted that resistor 26 serves not only to aid in dissipating the charge stored in capacitor 24 but also serves to keep the voltage at the lower terminal of capacitor 24 above ground. This is necessary, else capacitor 58 would have no effect in dissipating the charge stored in capacitor 24.

Figure 4:
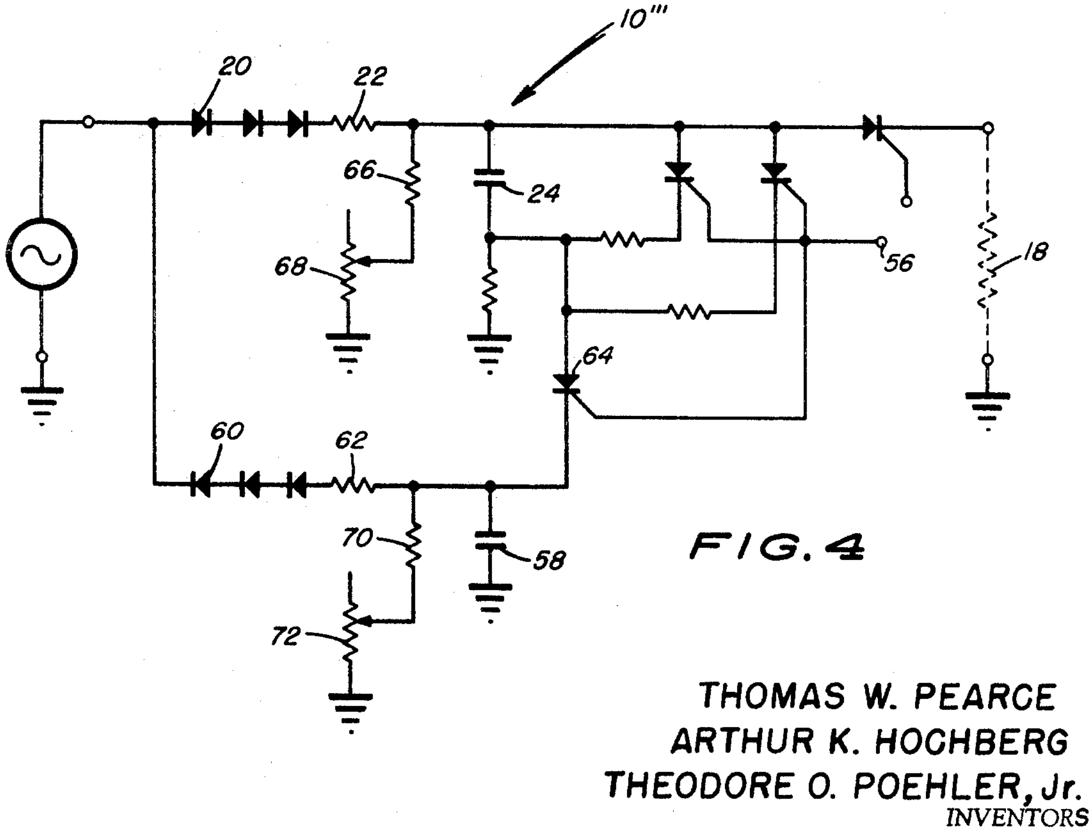
FIG. 4 is a circuit schematic of a fourth embodiment of the instant invention capable of closely defining the voltage level of the output pulses.

To add another degree of versatility to the pulse generator circuit of the instant invention, means can be provided for precisely controlling the charges stored in capacitor 24 and in capacitor 58. With reference then to FIG. 4, a circuit schematic of a fourth embodiment of the instant invention is shown. This fourth embodiment of the pulse generator is shown generally at 10''' and is similar in most respects to that pulse generator shown in FIG. 3; and therefore, like elements are similarly referenced and there follows only a discussion of the differences therebetween. Associated with the array of diodes 20 and the resistor 22, and further associated with the capacitor 24, is a fixed resistor 66 connected in series with a variable resistor 68; and associated with the array of diodes 60 and the resistors 62, and further associated with the capacitor 58, is a fixed resistor 70 connected in series with a variable resistor 72. It should be obvious that the combined values of resistors 66 and 68 determine the voltage stored across capacitor 24, and thereby determines the amount of circuit current which reaches the load 18. Therefore, it can be said that resistors 66 and 68 control the amount of current which is allowed to flow through the load. Similarly, it should be obvious that the combined values of resistors 70 and 72 determine the voltage stored across capacitor 58, and thereby determines the speed with which capacitor 24 can be discharged. Therefore, by balancing the values of the resistors associated with capacitor 24 and with capacitor 58, respectively, both the current reaching the load and the fall time associated with the pulses can be closely controlled.

In conclusion, there have been disclosed four embodiments of the subject invention which together make possible the provision of pulses having extremely rapid rise times and extremely rapid fall times, pulses which can be of the low-current variety or the high-current variety, pulses whose duration can be controlled within very close limits of tolerance and whose duration can be made extremely short, and pulses whose amplitude can be very closely controlled.

It is to be understood that the above-described embodiments and configurations are only illustrative of selected applications and principles of the instant invention, and that numerous other embodiments and configurations may be devised by those skilled in the art without departing from the spirit and scope of the invention.

We claim:

1. A pulse generator, comprising:

an output load;

first storage means for retaining a charge;

first current supply means for applying a charge to said first storage means;

second storage means;

second current supplying means for applying a charge to said second storage means that is opposite in polarity to the charge applied to said first storage means;

pulse initiating means for causing said first storage means to direct current into said load;

a first pulse diverting means, having an impedance which is less than the impedance of said load, for diverting current from said first storage means to ground; and a second pulse diverting means activated simultaneously with said first pulse diverting means for interconnecting said first and second storage means to divert the charge of said first storage means to said second storage means;

said pulse generator operating in such a manner that pulses are emitted therefrom which have durations equal to the time delay between the activation of said pulse initiating means and said first and second pulse diverting means.

2. The pulse generator as claimed in claim 1, further comprising:

first trigger means for issuing to said pulse initiating means a first triggering signal for causing said first storage means to direct current into said load; and second trigger means for issuing to said first and second pulse diverting means a second triggering signal, delayed in time from said first triggering signal for simultaneously activating said first and second pulse diverting means.

3. The pulse generator as claimed in claim 1, further comprising load current regulator means connected between the output of said first current supplying means and ground.

4. The pulse generator as claimed in claim 3 wherein said regulating means comprises a fixed resistor and a serially connected variable resistor.

5. The pulse generator as claimed in claim 1 wherein said first and second current supplying means each comprises a signal source serially connected with a rectifier means, the rectifier means of said first current supplying means being effective to pass a current of a polarity opposite to that passed by the rectifier means in said second current supplying means.

6. The pulse generator of claim 2 wherein said pulse initiating means is a silicon controlled rectifier having a gate, cathode and anode connection said gate being connected to said first trigger means and said anode and cathode beng respectively connected to said storage means and said output load.

7. The pulse generator of claim 2 wherein said first and second pulse diverting means are silicon controlled rectifiers whose gates are connected to said second trigger means.

8. The pulse generator of claim 1 wherein said first and second storage means are capacitors.

References Cited

UNITED STATES PATENTS 3,417,266 12/1968 Webb ---------- 307—265 XR

DONALD D. FORRER, Primary Examiner

S. T. KRAWCZEWICZ, Assistant Examiner

U.S. Cl. X.R.

307—252, 263